United States Patent
Rogers

(10) Patent No.: US 11,088,730 B2
(45) Date of Patent: Aug. 10, 2021

(54) STRIPLINE CONFORMAL PATCH ANTENNA

(71) Applicant: The Boeing Company, Chicago, IL (US)

(72) Inventor: John E. Rogers, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 159 days.

(21) Appl. No.: 16/141,694

(22) Filed: Sep. 25, 2018

(65) Prior Publication Data

US 2020/0099420 A1 Mar. 26, 2020

(51) Int. Cl.

| | |
|---|---|
| *H01Q 1/38* | (2006.01) |
| *H04B 7/0404* | (2017.01) |
| *H01Q 1/28* | (2006.01) |
| *H01Q 1/48* | (2006.01) |
| *H04B 7/06* | (2006.01) |
| *H01Q 1/52* | (2006.01) |
| *H01Q 21/00* | (2006.01) |
| *H01Q 21/06* | (2006.01) |

(52) U.S. Cl.
CPC .......... *H04B 7/0404* (2013.01); *H01Q 1/286* (2013.01); *H01Q 1/48* (2013.01); *H01Q 1/523* (2013.01); *H01Q 21/0087* (2013.01); *H01Q 21/061* (2013.01); *H04B 7/0613* (2013.01)

(58) Field of Classification Search
CPC .. H01Q 21/061; H01Q 21/0087; H01Q 1/523; H01Q 1/48; H01Q 1/286; H04B 7/0404; H04B 7/0613
See application file for complete search history.

(56) References Cited

U.S. PATENT DOCUMENTS 5,287,116 A * 2/1994 Iwasaki ............... H01Q 9/0442
343/700 MS
5,926,136 A * 7/1999 Ohtsuka ............... H01Q 3/02
343/700 MS (Continued)

OTHER PUBLICATIONS

Iwasaki, H., "A Circularly Polarized Small-Size Microstrip Antenna with a Cross Slot", IEEE Transactions on Antennas and Propagation, Oct. 1996, pp. 1399-1401, vol. 44, No. 10.

(Continued)

*Primary Examiner* — Dieu Hien T Duong
(74) *Attorney, Agent, or Firm* — Gates & Cooper LLP

(57) ABSTRACT

A stripline conformal patch antenna is disclosed. The antenna comprises circuit board that includes a composite dielectric which has a bottom surface and a top surface. The bottom surface comprises a bottom surface conductive ground plane. The top surface comprises an array of a plurality of conductive antenna elements and a top surface conductive ground plane disposed around the plurality of antenna elements. The stripline conformal antenna also includes a conductor, extending from an antenna input through the composite dielectric, the conductor forming a stripline between the top surface conductive ground plane and the bottom surface conductive ground plane. A plurality of electrical vias extend through the composite dielectric, electrically shorting the bottom surface conductive ground plane and the top surface conductive ground plane.

20 Claims, 9 Drawing Sheets

(56) References Cited

U.S. PATENT DOCUMENTS

| 2005/0062648 A1* | 3/2005 | Ryken | H01Q 23/00 343/700 MS |
| 2005/0073460 A1* | 4/2005 | Schmidt | H01Q 13/10 343/700 MS |
| 2015/0016078 A1* | 1/2015 | Yang | C23C 28/40 361/762 |

OTHER PUBLICATIONS

Pozar, D.M., "Microstrip Antenna Aperturecoupled to a Microstripline", Electronics Letters, Jan. 1985, pp. 49-50, vol. 21, No. 2.

Pozar, D.M., et al., "Increasing the bandwidth of a microstrip antenna by proximity coupling", Electronics Letters, Apr. 1987, pp. 368-369, vol. 23, No. 8.

Pozar, D.M., et al., "A Rigorous Analysis of a Microstripline Fed Patch Antenna", IEEE Transactions on Antennas and Propagation, Dec. 1987, pp. 1343-1350, vol. AP-35, No. 12.

Davidovitz, M., et al., "Rigorous Analysis of a Circular Patch Antenna Excited by a Microstrip Transmission Line", IEEE Transactions on Antennas and Propagation, Aug. 1989, pp. 949-958, vol. 37, No. 8.

Cook, B.S., et al., "Multilayer Inkjet Printing of Millimeter-Wave Proximity-Fed Patch Arrays on Flexible Substrates", IEEE Antennas and Wireless Propagation Letters, 2013, pp. 1351-1354, vol. 12.

\* cited by examiner

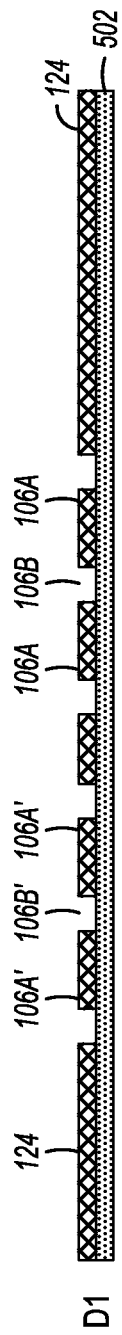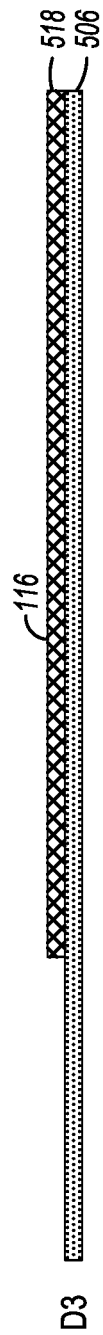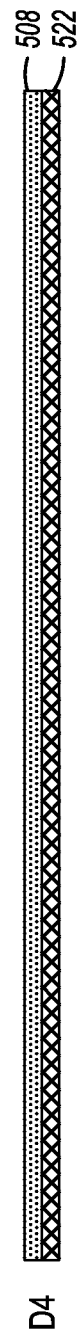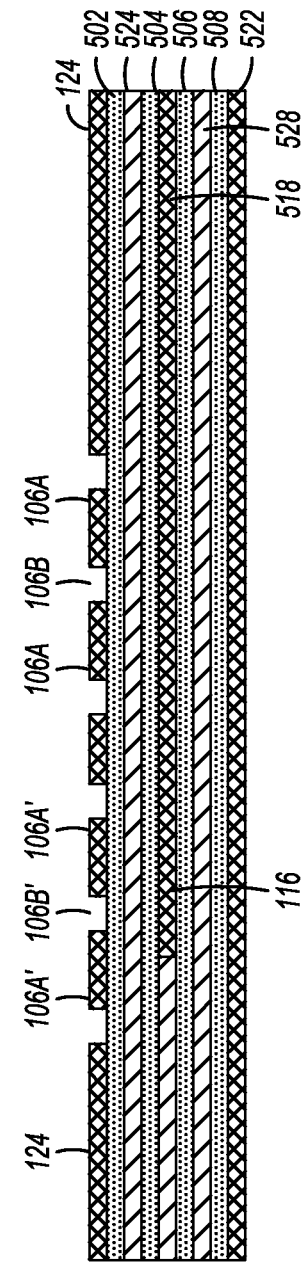

STRIPLINE CONFORMAL PATCH ANTENNA

BACKGROUND

1. Field

The present disclosure relates to systems for receiving and transmitting signals, and in particular to a stripline conformal patch antenna and a method for producing same.

2. Description of the Related Art

There is a need for sensors capable of conforming to non-planar surfaces such as aircraft wings and fuselages. Such sensors, known as conformal sensors, substantially conform to the contours of the surface that they are mounted on or of which surface they form a part. Low profile conformal sensor nodes are useful in many applications, including structural health monitoring and diagnostic testing. With regard to structural health monitoring, conformal antennas in sensor nodes can gather information about an aircraft in real-time, including airframe characteristics such as hoop stress, shear stress, compression, corrosion resistance, bending, torsion, crack growth, high local loads, longitudinal stress, and impacts. With regard to diagnostic testing, conformal antennas in sensor nodes can be used for worker safety and condition monitoring on the factory floor.

Unmanned aerial vehicles (UAVs) have conformal surfaces with low radii of curvature, and typically need light weight antennas with low radar cross sections and low air drag for improved efficiency. Also, like other aircraft, UAV surfaces are typically either metallic or a carbon fiber material, which are conductive in nature and may change the behavior of an antenna.

Existing planar antennas including co-planar microstrip feed and pin feed antennas are inherently bandwidth-limited due to their resonant nature. Pin feed antennas are not recommended for conformal applications as vias are well-known to be the first failure point during flexure. The bandwidth of a patch antenna has been shown to be increased by using an aperture coupled feed line.

What is needed is a conformal antenna with enhanced bandwidth characteristics.

SUMMARY

To address the requirements described above, this document discloses a stripline conformal antenna. The antenna comprises circuit board that includes a composite dielectric which has: a bottom surface and a top surface. The bottom surface comprises a bottom surface conductive ground plane. The top surface comprises an array of a plurality of conductive antenna elements and a top surface conductive ground plane disposed around (and electrically isolated from) the plurality of antenna elements. The stripline conformal antenna also includes a conductor, extending from an antenna input through the composite dielectric, the conductor being a stripline type between the top surface conductive ground plane and the bottom surface conductive ground plane. The stripline conformal antenna also includes a plurality of electrical vias extending through the composite dielectric, electrically shorting the bottom surface conductive ground plane and the top surface conductive ground plane.

In one embodiment, the antenna elements and the coplanar top surface conductive ground plane are formed by a first conductive material on a top surface of a first dielectric layer of the composite dielectric, the conductor is formed by a second conductive material on a top surface of a second dielectric layer of the composite dielectric, and the bottom surface conductive ground plane is formed by a third conductive material on a bottom surface of a third dielectric layer of the composite dielectric.

Another embodiment is evidenced by a method of forming a stripline conformal antenna, comprising: disposing an array of conductive antenna elements and a coplanar top surface conductive ground plane on a top surface of a first dielectric layer, wherein the top surface conductive ground plane is electrically isolated from each conductive antenna element. The method also comprises disposing a conductor on a bottom surface of a second dielectric layer (or on a top surface of a third dielectric layer); disposing a bottom surface conductive ground plane on a bottom surface of a fourth dielectric layer; laminating the first dielectric layer, the second dielectric layer, the third dielectric layer, and the fourth dielectric layer to form a composite dielectric. Upon lamination the conductor: is disposed between each of the conductive antenna elements and the bottom surface conductive ground plane; and extends from an antenna input and forms a stripline between the top surface conductive ground plane and the bottom surface conductive ground plane. Finally, the method also includes etching a plurality of electrical vias extending through the composite dielectric, electrically shorting the bottom surface conductive ground plane and the top surface conductive ground plane. In one implementation, the plurality of electrical vias are disposed along a periphery of the bottom surface conductive ground plane and the top surface conductive ground plane. Still another embodiment is evidenced by a stripline conformal antenna, formed by performing the operations outlined above.

BRIEF DESCRIPTION OF THE DRAWINGS

Referring now to the drawings in which like reference numbers represent corresponding parts throughout:

FIGS. 7A-7C, which depict the stripline conformal antenna at the different stages of the production at the slice B-B' illustrated in FIG. 6.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

In this disclosure, a polarization bandwidth-enhanced conformal antenna is presented. Polarization bandwidth is enhanced by using an aperture coupled antenna element with an inclusive slot, a ground plane coplanar to the aperture coupled antenna element, an embedded stripline feed network, and a lower ground plane below the stripline feed network. The slot and coplanar ground decrease the axial ratio thereby increasing the circular polarization bandwidth. Circularly polarized antennas, in comparison to linearly polarized antennas, are generally desired as they have less power loss from transmitter to receiver due to antenna misalignment. Furthermore, the disclosed antenna has a lower ground plane that minimizes any change in the antenna's electrical behavior due to the presence of conductive surfaces (e.g., airplane wing, fuselage, etc.); better known as "surface agnostic" behavior.

The antenna comprises a number of features which can be characterized by a number of embodiments. Such features may also be combined in selected embodiments as disclosed further herein. One feature is an embedded RF stripline residing between a top surface ground plane (also known as coplanar ground plane) that is electrically shorted to a bottom surface ground plane (also known as lower ground plane). Another feature is that the antenna uses an aperture coupled feed network to simplify antenna feeding, planar arraying, and reduce failure due to antenna flexure. Still another feature is that the antenna can utilize thin RF dielectrics for conformal applications due to the use of an aperture coupled feed. Finally, the antenna is circularly polarized with increased polarization bandwidth by using aperture coupled antenna elements with inclusive slots and a coplanar ground plane.

Figure 1A:
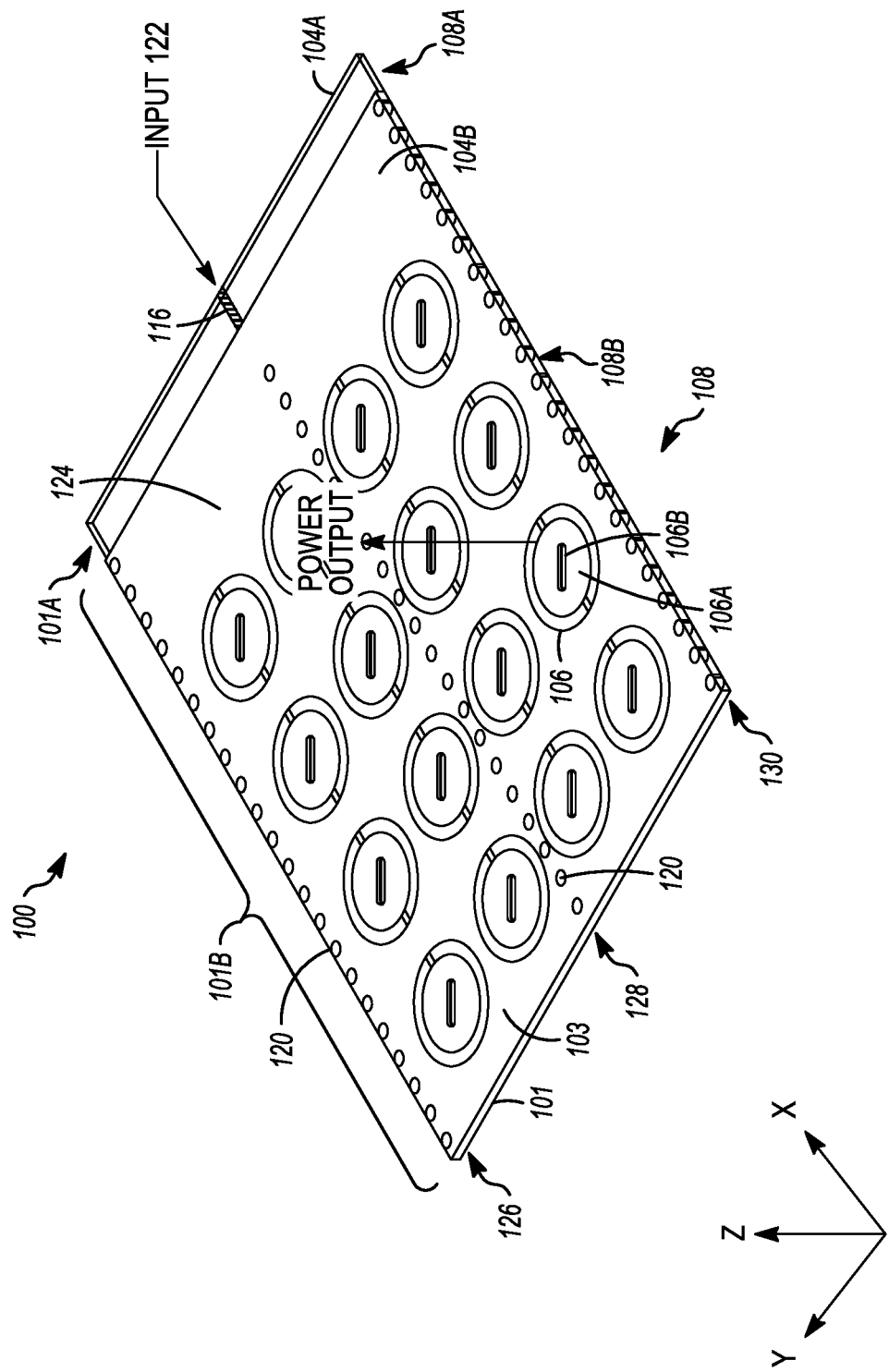
FIGS. 1A and 1B are diagrams illustrating one embodiment of the stripline conformal patch antenna.
Figure 1B:
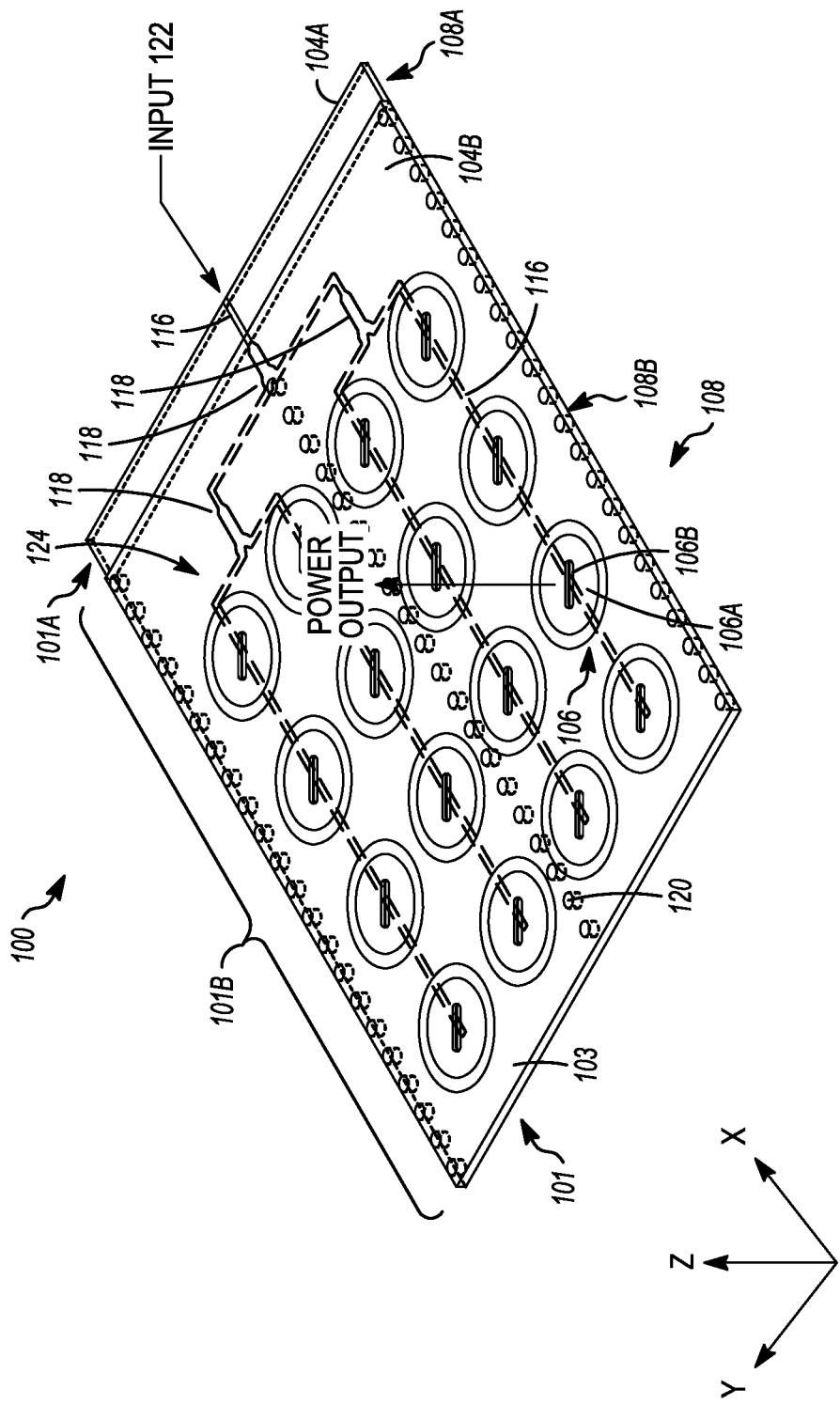

FIGS. 1A and 1B are diagrams illustrating one embodiment of the stripline conformal (i.e., conforming to the surface to which it is applied) patch antenna 100 (hereinafter alternatively referred to simply as antenna 100). In the illustrated embodiment, the antenna 100 includes an RF circuit board 101 having a composite dielectric 103. The RF circuit board 101 includes a circuit board first portion 101A and a circuit board second portion 101B. The RF circuit board 101 also comprises a top planar surface 104 that has a first top surface planar portion 104A and a second top surface planar portion 104B. The second top surface planar portion 104B has at least one antenna element 106. In the illustrated embodiment, a 4×4 array of antenna elements 106 is included, although the array may be non-square and may have a greater or lesser number of antenna elements 106.

The RF circuit board 101 also comprises a bottom planar surface 108 which has a first bottom surface planar portion 108A and a second bottom surface planar portion 108B. A bottom surface ground plane 107 extends along the first bottom surface planar portion 108A and the second bottom surface planar portion 108B. A conductor 116 extending on a top surface of the circuit board first portion 101A and through the circuit board second portion 101B forms a microstrip with the bottom surface ground plane 107 of the first bottom surface planar portion 108A and a stripline with a top surface conductive ground plane 124 (disposed on the second top surface planar portion 104B) and the second bottom surface planar portion 108B of the bottom surface ground plane 107.

In the illustrated embodiment in FIGS. 1A and 1B, the conductor 116 includes one or more stripline power dividers 118 disposed in the X-axis between the antenna input 122 and the antenna elements 106 and in the Z-axis between the top surface conductive ground plane 124 and the bottom surface ground plane 107. The power dividers 118 divide the antenna input into signals of reduced power that are thereafter provided to downstream antenna elements 106.

Each antenna element 106 comprises a conductive antenna element component 106A having a conductive surface with a slot (or aperture) 106B therein. This aperture 106B couples the antenna element 106 to the stripline feed formed by the conductor 116. The stripline feed is electrically coupled to both the bottom surface ground plane 107 and the top surface conductive ground plane 124.

In the illustrated embodiment, the antenna 100 comprises a 4×4 array of antenna elements 106. The 4×4 array has aperture coupled antenna elements 106 with inclusive slots 106B along with a top surface conductive ground plane 124 (or coplanar ground plane), a bottom surface ground plane 107 (or lower ground plane), and a conductor 116 that divides power to a stripline feed network. Also included are a plurality of electrically conductive vias 120 electrically shorting the top surface conductive ground plane 124 to the bottom surface ground plane 107. As is discussed further below, the RF circuit board 101 includes four dielectric layers separating three conductive layers. The dimensions of the antenna elements (i.e., diameter, slot length, slot width) and gap (between the coplanar ground and antenna elements) are determined to maximize radiated power at the desired operating frequency.

Figure 2A:
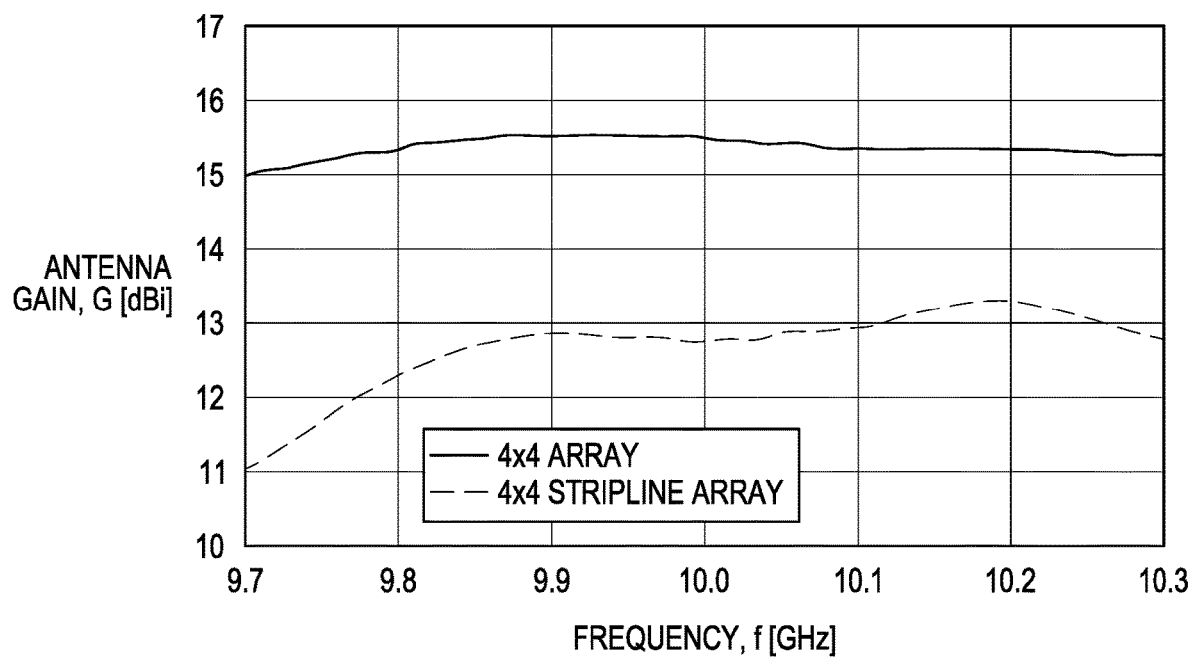
FIGS. 2A and 2B are diagrams depicting plots of the predicted performance of a 4×4 stripline conformal patch antenna designed to operate near 10 GHz.
Figure 2B:
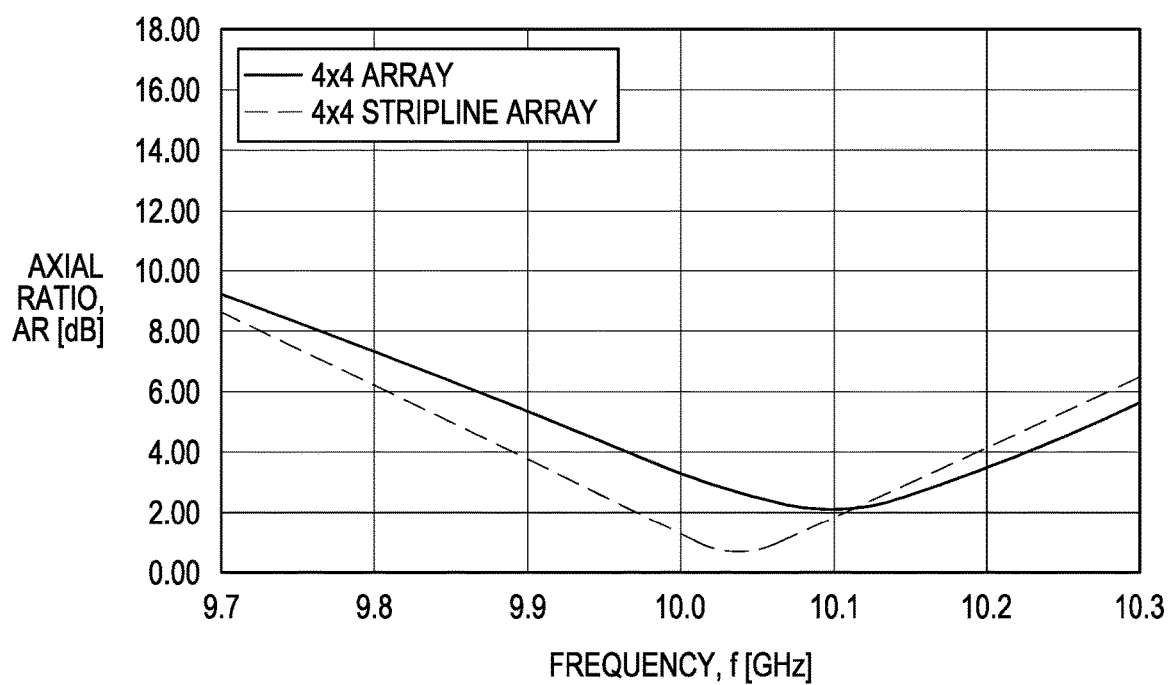

FIGS. 2A and 2B are diagrams depicting plots (generated with a finite element model (FEM) solver) of the predicted performance of a 4×4 electronically steerable conformal antenna designed to operate near 10 GHz. The surface dimensions of the 4×4 array are 77 mm×57 mm and the board has four 10 Mil PYRALUX layers.

FIG. 2A is a diagram illustrating the predicted antenna gain (dBi) as a function of frequency (GHz) for a standard 4×4 array without a coplanar ground (e.g. top surface conductive ground plane 124) and for a 4×4 array of identical design, but including the coplanar ground (thus implementing the stripline 4×4 array such as is illustrated in FIGS. 1A and 1B). Note that there is a decrease in gain of about 2 to 2.5 dB around 10 GHz.

FIG. 2B is a diagram showing the predicted axial ratio of the standard 4×4 array without the coplanar ground and for the stripline 4×4 array with the coplanar ground (illustrated in FIGS. 1A and 1B). The results show that the stripline 4×4 array with the coplanar ground improves the 2:1 axial ratio bandwidth more than 200 MHz or about 25%.

Figure 3:
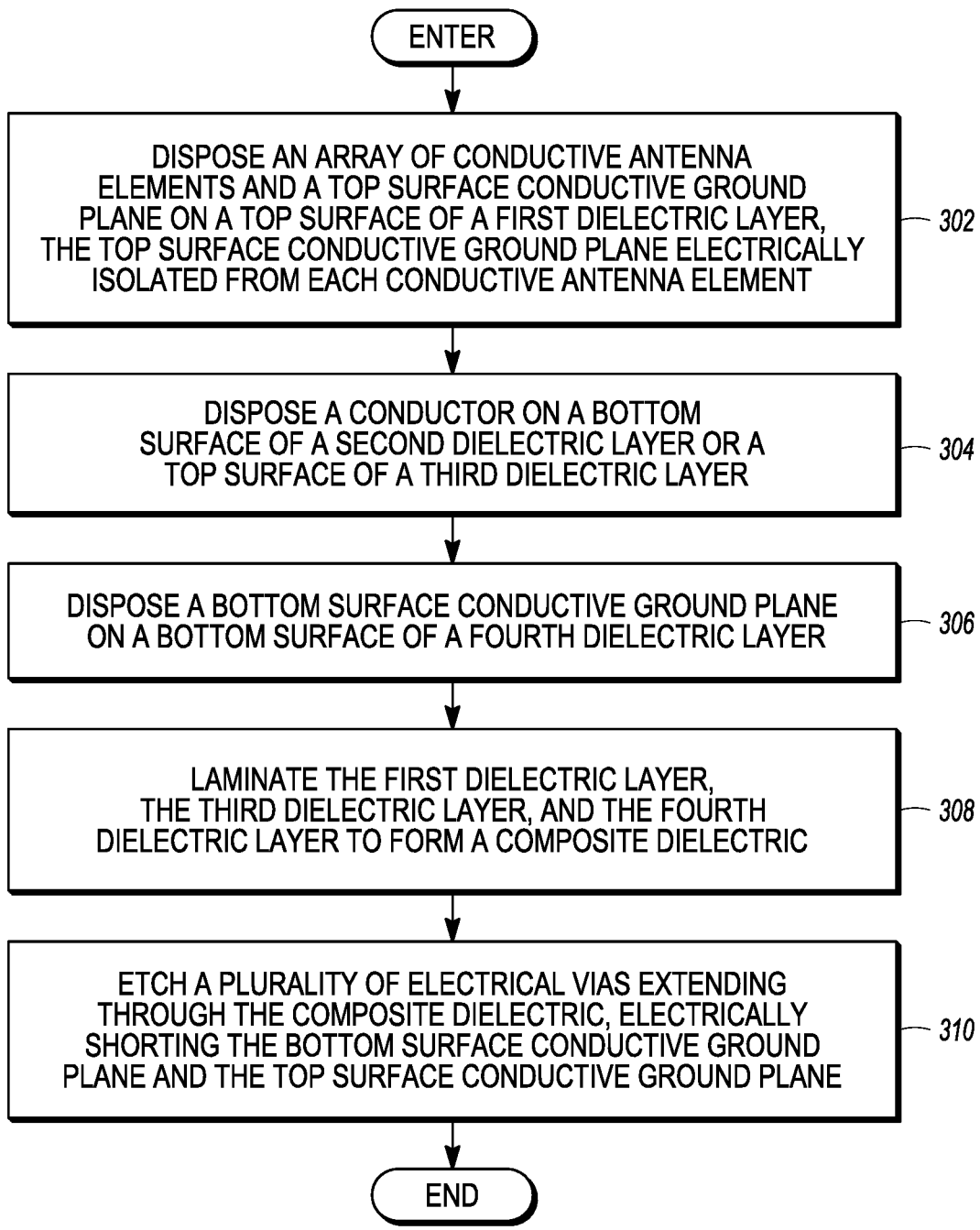
FIG. 3 is a diagram illustrating exemplary operations that can be used to produce the stripline conformal antenna.
Figure 4:
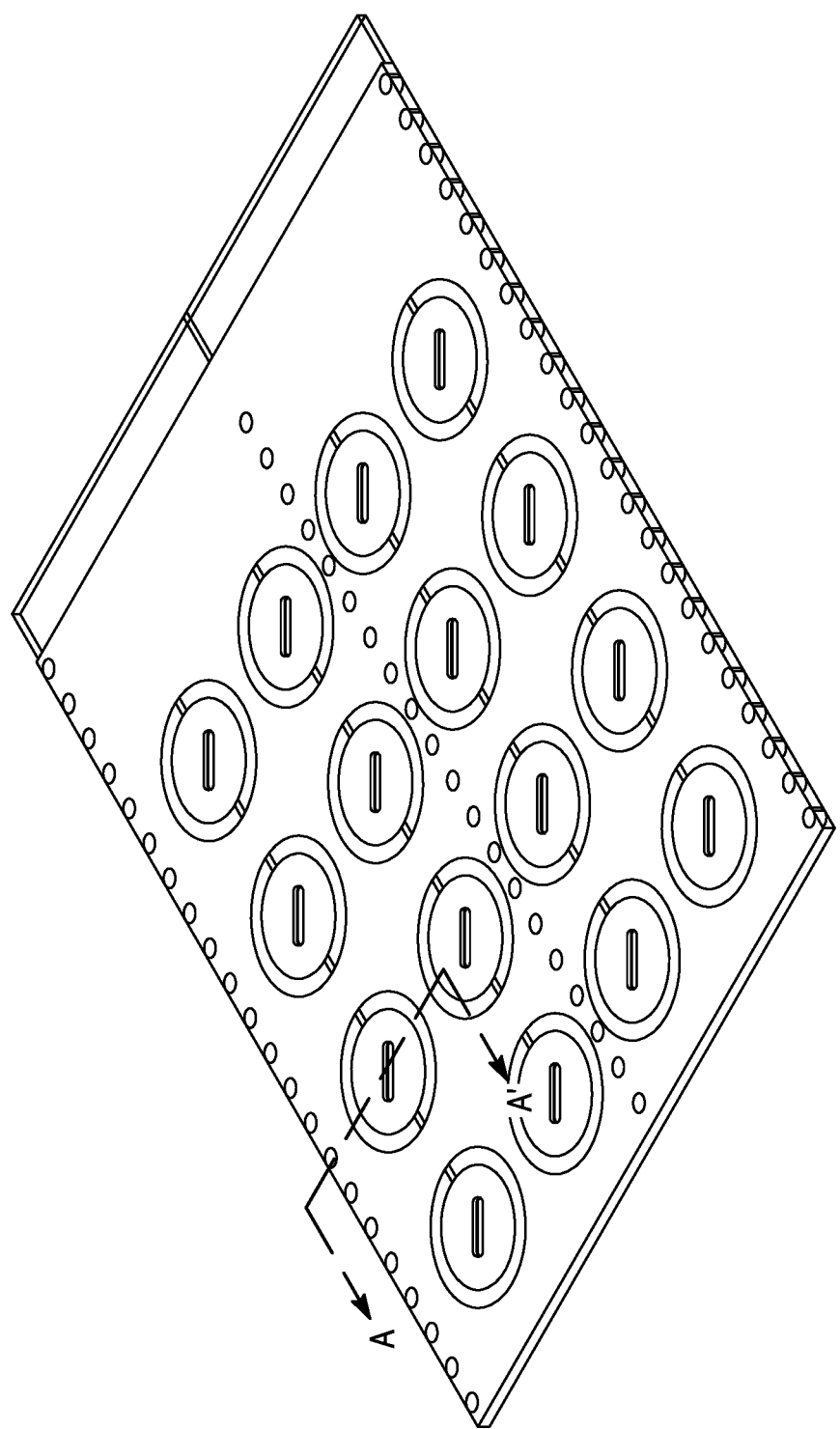
FIG. 4 is a diagram illustrating the slice A-A' of the antenna depicted in FIGS. 5A-5C.
Figure 5A:
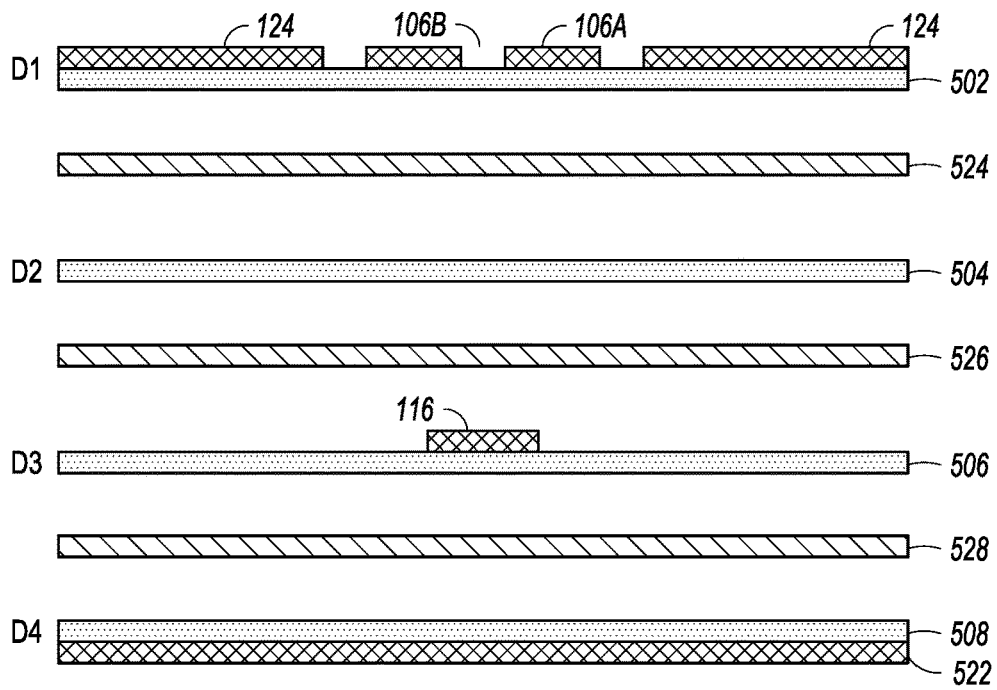
FIGS. 5A-5C are diagrams depicting the stripline conformal antenna at different stages of a representative production process at slice A-A' of FIG. 4.
Figure 5B:
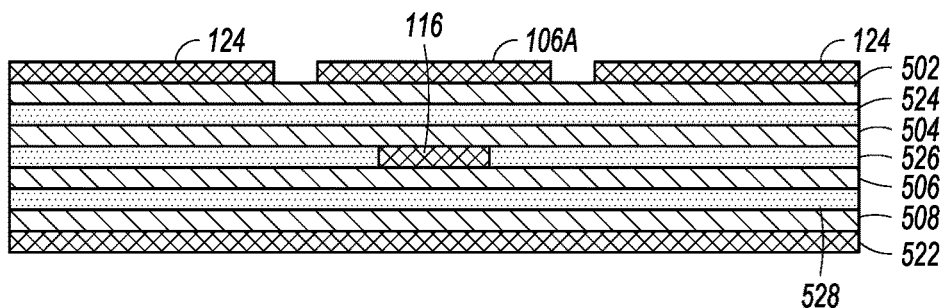
Figure 5C:
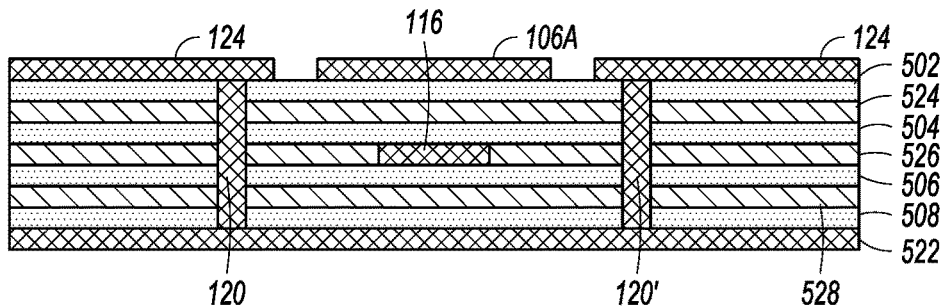
Figure 6:
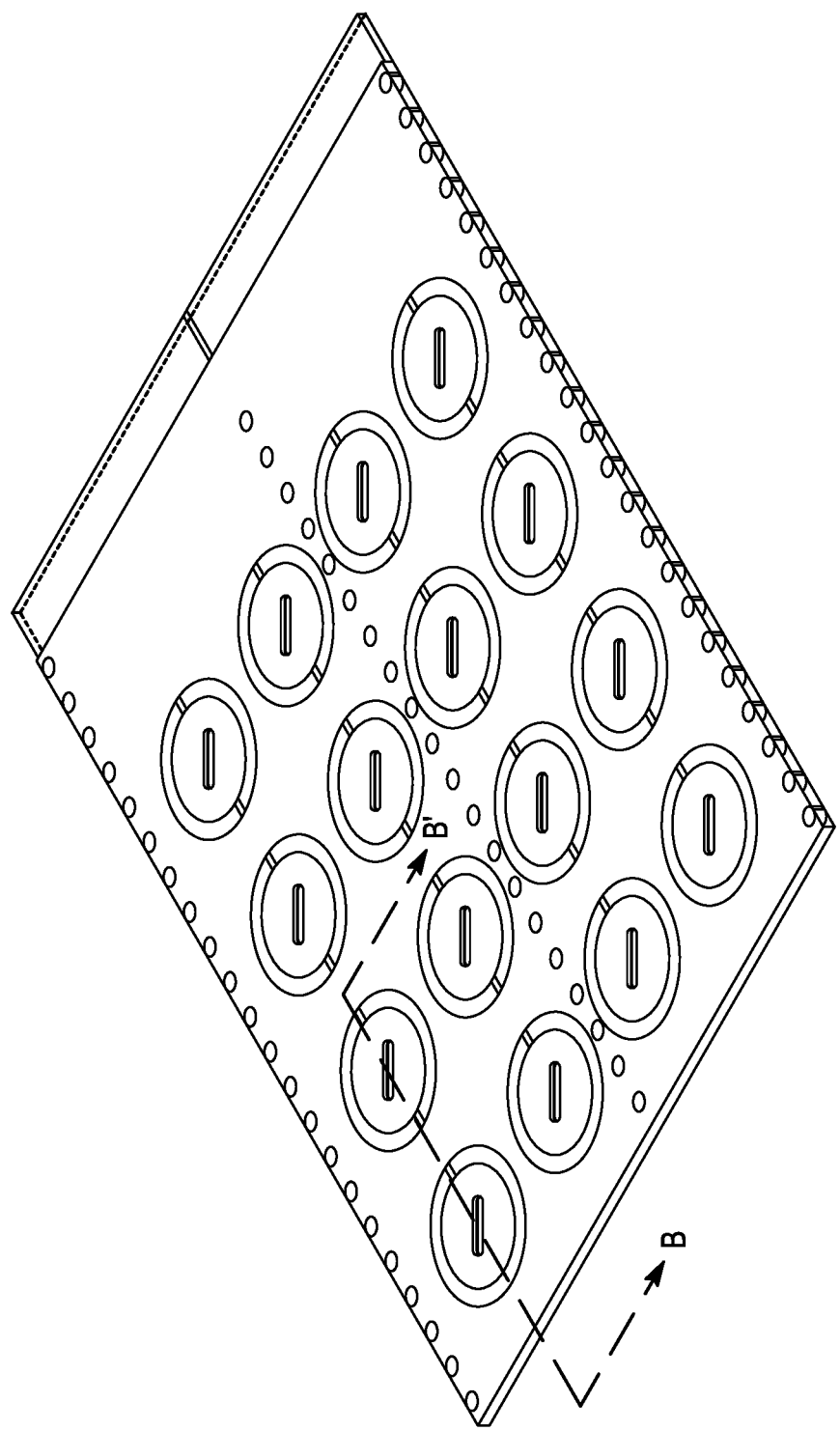
FIG. 6 is a diagram illustrating the slice B-B' of the antenna depicted in FIGS. 7A-7C.

FIG. 3 is a diagram illustrating exemplary operations that can be used to produce the stripline conformal antenna 100. FIG. 3 will be discussed in conjunction with FIGS. 4, 5A-5C, 6 and 7A-7C, which are diagrams depicting the electronically steerable conformal antenna at different stages of a representative production process. FIG. 4 is a diagram illustrating the cut A-A' of the antenna 100 depicted in FIGS. 5A-5C, while FIG. 6 is a diagram illustrating the cut B-B' of the antenna 100 depicted in FIGS. 7A-7C.

Turning now to FIG. 3, in block 302, one or more conductive antenna element components 106A having slots 106B and a top surface conductive ground plane 124 are disposed on a top surface of a first dielectric layer 502 (D1). The top surface conductive ground plane 124 is electrically isolated from each of the conductive antenna element components 106A. In block 304, a conductor 116 is disposed on a top surface of a third dielectric layer 506 (D2).

In block 306, a bottom surface conductive ground plane 522 is disposed on a bottom surface of a fourth dielectric layer 508 (D4). In block 308, the first dielectric layer 502, the second dielectric layer 504, the third dielectric layer 506 and the fourth dielectric layer 508 are aligned so that the conductor 116 is disposed between each of the antenna elements 106 and the bottom surface conductive ground plane 522 and extends from an antenna input 122 and forms a stripline between the top surface conductive ground plane 124 and the bottom surface conductive ground plane 522 and thereafter laminated to form the composite dielectric 103. Accordingly, upon lamination, the conductor 116 is disposed between each of the antenna elements 106 and the bottom surface conductive ground plane 522 and extends from an antenna input 122 and forms a stripline between the top surface conductive ground plane 124 and the bottom surface conductive ground plane 522.

In block 310, a plurality of electrically conductive vias 120 are created through the composite dielectric. This is accomplished, for example, by etching, milling or drilling the vias 120, and coating the inner surface of the vias 120 with conductive material. The plurality of electrically conductive vias 120 electrically short the bottom surface conductive ground plane 522 to the top surface conductive ground plane 124.

The number and location of the electrically conductive vias 120 electrically shorting the bottom surface conductive ground plane 522 to the top surface conductive ground plane 124 is chosen to assure that the conductor 116 operates as a low loss stripline. The exemplary embodiment illustrated in FIG. 1A illustrates a 4×4 array of antenna elements 106, with three rows of vias 120, including a first row 126 of vias, a second row 128 of vias, and a third row 130 of vias. The first row 126 and third row 130 of vias are disposed on opposing edges of a periphery of the RF circuit board 101, and the second row 128 of vias is disposed equidistant from and between the first row 126 and third row 130 of vias, between the second and third row of antenna elements 106. In another embodiment, the vias 120 are disposed along the entire periphery of the RF circuit board 101.

Other embodiments include additional rows of vias 120. For example, FIG. 5C illustrates via 120 and additional via 120' which is one of the vias in a row of vias between the first row of antenna elements 106 and the second row of antenna elements 106. Further, vias 120 may also be disposed in columns between the antenna elements 106 instead of or in addition to the rows of vias illustrated in FIGS. 1A and 1B.

The foregoing steps illustrate the creation of one antenna element 106 on the RF circuit board 101. Typically, the antenna 100 comprises an array of elements such as the 4×4 array of elements illustrated in FIG. 1A. In such case, the operations disclosed above include analogous operations as applied to any other desired antenna elements 106 in the array. For example, FIGS. 7A-7C illustrate the stripline conformal antenna 100 at different stages of production along the cut B-B' depicted in FIG. 6. Note that a second conductive antenna element component 106A' having second inclusive slot 106B' is disposed on the top side of the first dielectric layer 502. FIGS. 7A-7C also illustrate disposing the conductor 116 such that the conductor 116 extends through composite dielectric 103.

Furthermore, the disposition of conductive material on the dielectric may be accomplished by additive methods such as printing or film deposition of suitable conductive materials (e.g., silver, copper, etc.) to the appropriate surface of the dielectric. Deposition of conductive materials may also be accomplished by combined additive and subtractive methods such as laser etching, milling, or wet etching. Hence, the conductive materials may be deposited on the entire surface of the dielectric layer(s) and unwanted portions are subsequently etched away. For example, the top of the first dielectric layer 502 may be formed by disposing a conductive material along the entire top surface, then etching (or otherwise removing) the conductive material from the slot 106B and the area surrounding the conductive antenna element component 106' and the top surface conductive ground plane 124.

The lamination of the first dielectric layer 502, the second dielectric layer 504, the third dielectric layer 506, and the fourth dielectric layer 508 can be accomplished by disposing a first adhesive film 524 between the first dielectric layer 502 and the second dielectric layer 504, disposing a second adhesive film 526 between the second dielectric layer 504 and the third dielectric layer 506, and disposing a third adhesive film 528 between the third dielectric layer 506 and the fourth dielectric layer 508. Portions of the adhesive films 524, 526, and 528 that must be removed to achieve the structure shown in FIGS. 5A-5C may be removed before lamination, or processed after lamination (e.g., using an etching technique). Further, layers 502, 504, 506 and 508 may be created in any order, but unless otherwise noted, should be layered as illustrated before lamination. Nominally, dielectric layers 502, 504, 506 and 508 are composed of a dielectric material having a relative permittivity (ratio of absolute permittivity to the permittivity of a vacuum) of approximately ten.

Signal Transception

The foregoing antenna 100 can be used to transmit and/or receive (transceive) signals. In transmission, signals provided to the feed created by conductor 116 are transformed into a transmitted RF signal by antenna elements 106 and associated structures. In reception, RF signals are provided to the antenna elements 106 and associated structures and transformed into a received signal at the conductor 116. For example, referring again to FIG. 1A, when used for transmission, the antenna 100 receives a signal at power input, and this signal is provided by the conductor 116 to the aperture coupled antenna elements 106 for transmission as an RF signal.

Hardware Environment

Figure 8:
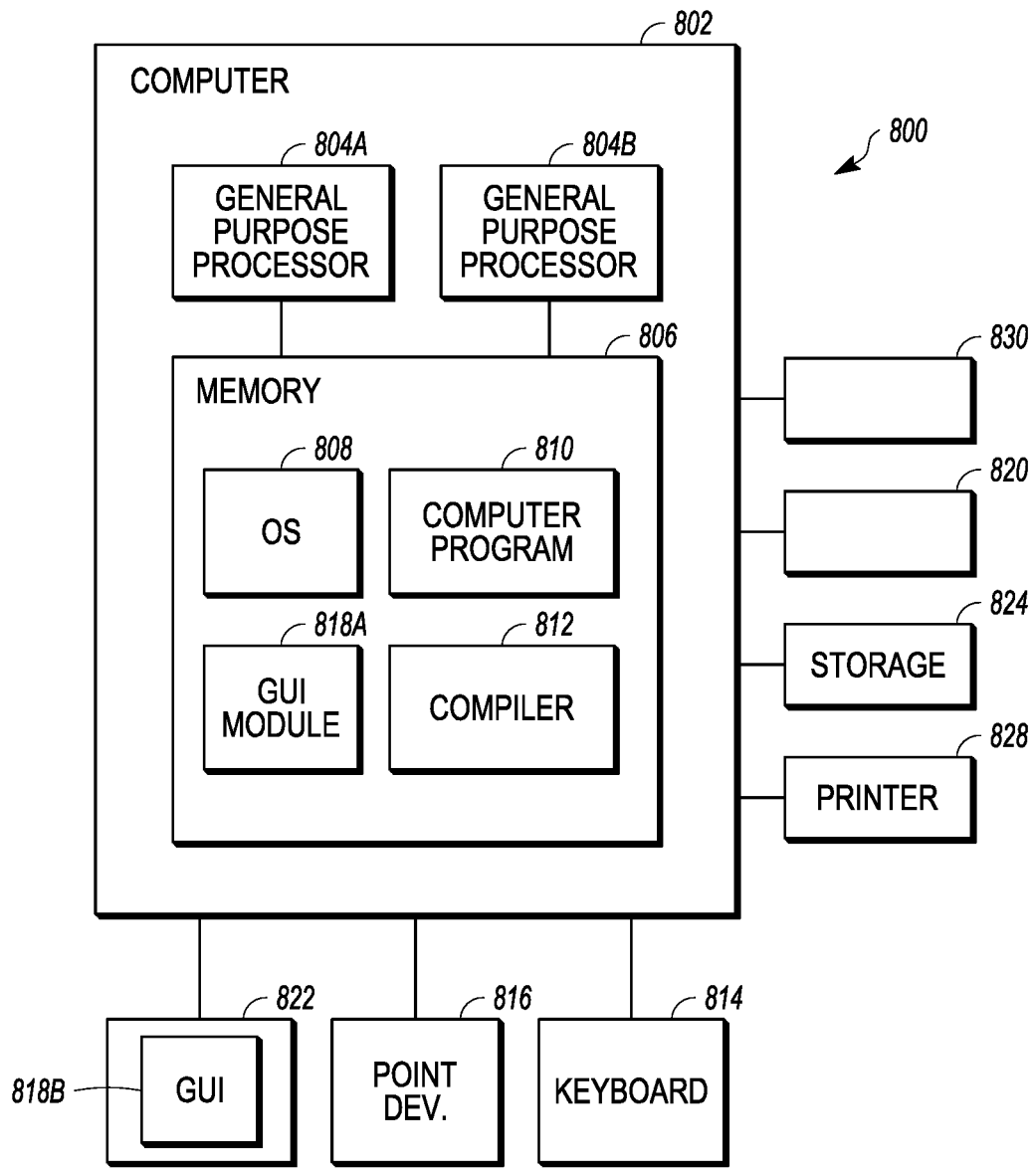
FIG. 8 is a diagram illustrating an exemplary computer system that could be used to implement processing elements of the above disclosure.

FIG. 8 is a diagram illustrating an exemplary computer system 800 that could be used to implement processing elements of the above disclosure, including the defining of the conductive structures and etching of the dielectric layers. The computer 802 comprises at least one processor such as a general purpose processor 804A and/or a special purpose processor 804B and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer, etc. Of course, those skilled in the art will recognize that any combination of the above components, or any number of different components, peripherals, and other devices, may be used with the computer 802, including printer 828.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A stripline conformal antenna, comprising:
   circuit board, comprising:
   a composite dielectric, having:
      a bottom surface, having a bottom surface conductive ground plane; and
      a top surface, having:
         an array of a plurality of antenna elements; and
         a top surface conductive ground plane disposed around and electrically isolated from the plurality of antenna elements;
      a conductor, extending from an antenna input through the composite dielectric, the conductor forming a stripline between the top surface conductive ground plane and the bottom surface conductive ground plane from the antenna input to each of the antenna elements; and
      a plurality of electrical vias extending through the composite dielectric, electrically shorting the bottom surface conductive ground plane and the top surface conductive ground plane;
   wherein the antenna input comprises a microstrip formed by the conductor, a dielectric layer of the composite dielectric, and the bottom surface conductive ground plane; and
   wherein each of the plurality of antenna elements comprises an inclusive slot coplanar with the top surface conductive ground plane and centered over the conductor.

2. The antenna of claim 1, wherein the plurality of electrical vias are disposed along a periphery of the bottom surface conductive ground plane and the top surface conductive ground plane.

3. The antenna of claim 1, wherein the plurality of electrical vias are further disposed between rows or columns of the array of the plurality of antenna elements.

4. The antenna of claim 3, wherein the conductor further forms one or more power dividers between the antenna input and portions of the conductor disposed between the antenna elements and the bottom surface conductive ground plane.

5. The antenna of claim 1, wherein:
   the antenna elements and the top surface conductive ground plane are formed by a first conductive material on a top surface of a first dielectric layer of the composite dielectric;
   the conductor is formed by a second conductive material on a bottom surface of a second dielectric layer or a top surface of a third dielectric layer of the composite dielectric; and
   bottom surface conductive ground plane is formed by a third conductive material on a bottom surface of a fourth dielectric layer of the composite dielectric.

6. The antenna of claim 5, wherein:
   the first conductive material is patterned on the top surface of the first dielectric layer of the composite dielectric;
   the second conductive material is patterned on the bottom surface of the second dielectric layer or the top surface of the third dielectric layer of the composite dielectric; and
   the third conductive material is patterned on the bottom surface of the fourth dielectric layer of the composite dielectric.

7. The antenna of claim 5, wherein:
   the first conductive material is printed on the top surface of the first dielectric layer of the composite dielectric;
   the second conductive material is printed on the bottom surface of the second dielectric layer or the top surface of the third dielectric layer of the composite dielectric; and
   the third conductive material is printed on the bottom surface of the fourth dielectric layer of the composite dielectric.

8. A method of forming a stripline conformal antenna, the method comprising:

disposing an array of conductive antenna elements and an electrically isolated top surface conductive ground plane on a top surface of a first dielectric layer, the top surface conductive ground plane electrically isolated from each conductive antenna element;
disposing a conductor on a bottom surface of a second dielectric layer or a top surface of a third dielectric layer;
disposing a bottom surface conductive ground plane on a bottom surface of a fourth dielectric layer;
laminating the first dielectric layer, the second dielectric layer, the third dielectric layer, and the fourth dielectric layer to form a composite dielectric, wherein upon lamination, the conductor:
  is disposed between each of the conductive antenna elements and the bottom surface conductive ground plane; and
  extends from a microstrip antenna input formed by the conductor and the bottom surface conductive ground plane and forms a stripline between the top surface conductive ground plane and the bottom surface conductive ground plane from the microstrip antenna input to each of the conductive antenna elements; and
etching a plurality of electrical vias extending through the composite dielectric, electrically shorting the bottom surface conductive ground plane and the top surface conductive ground plane;
wherein each conductive element of the array of conductive antenna elements comprises an inclusive slot coplanar with the top surface conductive ground plane and centered over the conductor.

9. The method of claim 8, wherein the plurality of electrical vias are disposed along a periphery of the bottom surface conductive ground plane and the top surface conductive ground plane.

10. The method of claim 9, wherein the plurality of electrical vias are further disposed between rows or columns of the array of the conductive antenna elements.

11. The method of claim 8, wherein the conductor further forms one or more power dividers between the microstrip antenna input and portions of the conductor disposed between the conductive antenna elements and the bottom surface conductive ground plane.

12. The method of claim 8, wherein:
disposing an array of conductive antenna elements and a top surface conductive ground plane on a top surface of a first dielectric layer comprises:
  patterning the array of conductive antenna elements and the top surface conductive ground plane on the top surface of the first dielectric layer;
disposing a conductor on a bottom surface of a second dielectric layer or a top surface of a third dielectric layer comprises:
  patterning the conductor on the bottom surface of the second dielectric layer or the top surface of the third dielectric layer; and
disposing a bottom surface conductive ground plane on a bottom surface of a fourth dielectric layer comprises:
  patterning the bottom surface conductive ground plane on the bottom surface of the fourth dielectric layer.

13. The method of claim 8, wherein:
disposing an array of conductive antenna elements and a top surface conductive ground plane on a top surface of a first dielectric layer comprises:
  printing the array of conductive antenna elements and the top surface conductive ground plane on the top surface of the first dielectric layer;
disposing a conductor on a bottom surface of a second dielectric layer or a top surface of a third dielectric layer comprises:
  printing the conductor on the bottom surface of the second dielectric layer or the top surface of the third dielectric layer; and
disposing a bottom surface conductive ground plane on a bottom surface of a fourth dielectric layer comprises:
  printing the bottom surface conductive ground plane on the bottom surface of the fourth dielectric layer.

14. The method of claim 8, wherein disposing a conductor on a bottom surface of a second dielectric layer or a top surface of a third dielectric layer comprises disposing the conductor on the bottom surface of the second dielectric layer.

15. The method of claim 8, wherein: disposing a conductor on a bottom surface of a second dielectric layer or a top surface of a third dielectric layer comprises disposing the conductor on a top surface of the third dielectric layer.

16. A stripline conformal antenna, formed by performing steps comprising the steps of:
disposing an array of conductive antenna elements and a top surface conductive ground plane on a top surface of a first dielectric layer, the top surface conductive ground plane electrically isolated from each conductive antenna element;
disposing a conductor on a bottom surface of a second dielectric layer or a top surface of a third dielectric layer;
disposing a bottom surface conductive ground plane on a bottom surface of a fourth dielectric layer;
laminating the first dielectric layer, the second dielectric layer, the third dielectric layer, and the fourth dielectric layer to form a composite dielectric, wherein upon lamination, the conductor:
  is disposed between each of the conductive antenna elements and the bottom surface conductive ground plane; and
  extends from a microstrip antenna input formed by the conductor and the bottom surface conductive ground plane and forms a stripline between the top surface conductive ground plane and the bottom surface conductive ground plane from the microstrip antenna input to each of the conductive antenna elements; and
etching a plurality of electrical vias extending through the composite dielectric, electrically shorting the bottom surface conductive ground plane and the top surface conductive ground plane.

17. The stripline conformal antenna of claim 16, wherein the plurality of electrical vias are disposed along a periphery of the bottom surface conductive ground plane and the top surface conductive ground plane.

18. The stripline conformal antenna of claim 17, wherein the plurality of electrical vias are further disposed between rows or columns of the array of the conductive antenna elements.

19. The stripline conformal antenna of claim 18, wherein the conductor further forms one or more power dividers between the microstrip antenna input and portions of the conductor disposed between the conductive antenna elements and the bottom surface conductive ground plane.

20. A method of transmitting a signal, comprising:
receiving the signal at an input of an antenna, the antenna comprising:
- a composite dielectric, having:
  - a bottom surface, having a bottom surface conductive ground plane; and
  - a top surface, having:
    - an array of a plurality of antenna elements; and
    - a top surface conductive ground plane disposed around and electrically isolated from the plurality of antenna elements;
- a conductor, extending from a microstrip antenna input formed by the conductor and the bottom surface conductive ground plane through the composite dielectric, the conductor forming a stripline between the top surface conductive ground plane and the bottom surface conductive ground plane from the microstrip antenna input to each of the antenna elements; and
- a plurality of electrical vias extending through the composite dielectric, electrically shorting the bottom surface conductive ground plane and the top surface conductive ground plane; and transmitting the received signal via the antenna;
wherein each of the plurality of antenna elements comprises an inclusive slot coplanar with the top surface conductive ground plane and centered over the conductor.

\* \* \* \* \*